United States Patent
Gruenter

(10) Patent No.: US 7,373,920 B2
(45) Date of Patent: May 20, 2008

(54) METHOD FOR CONTROLLING AN INTERNAL COMBUSTION ENGINE

(75) Inventor: Thomas Gruenter, Steinheim-Höpfigheim (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 11/799,062

(22) Filed: Apr. 30, 2007

(65) Prior Publication Data

US 2007/0255486 A1    Nov. 1, 2007

(30) Foreign Application Priority Data

Apr. 29, 2006    (DE) .................. 10 2006 020 062

(51) Int. Cl.
*F02D 33/02*    (2006.01)
*F02D 41/10*    (2006.01)

(52) U.S. Cl. .................. 123/361; 123/399; 123/492
(58) Field of Classification Search ................ 123/350, 123/361, 399, 492
See application file for complete search history.

(56) References Cited

U.S. PATENT DOCUMENTS

| | | | | |
|---|---|---|---|---|
| 5,078,109 A | * | 1/1992 | Yoshida et al. | 123/350 |
| 5,117,711 A | * | 6/1992 | Iizuka | 477/121 |
| 5,391,127 A | * | 2/1995 | Nishimura | 123/350 |
| 5,421,302 A | * | 6/1995 | Livshits et al. | 123/339.23 |
| 6,032,644 A | * | 3/2000 | Bederna et al. | 123/339.15 |
| 6,220,226 B1 | * | 4/2001 | Alm et al. | 123/492 |
| 6,237,563 B1 | * | 5/2001 | Froehlich et al. | 123/350 |
| 6,530,358 B2 | | 3/2003 | Kalweit et al. | |
| 6,854,444 B2 | * | 2/2005 | Plagge et al. | 123/350 |
| 2002/0050264 A1 | | 5/2002 | Kalweit et al. | |
| 2003/0221669 A1 | * | 12/2003 | Henn et al. | 123/399 |
| 2004/0016419 A1 | * | 1/2004 | Satou et al. | 123/492 |

FOREIGN PATENT DOCUMENTS

| | | |
|---|---|---|
| DE | 197 39 567 A1 | 3/1999 |
| DE | 197 42 083 A1 | 3/1999 |
| DE | 100 43 691 A1 | 3/2002 |
| DE | 100 46 446 A1 | 3/2002 |

* cited by examiner

*Primary Examiner*—Erick Solis
(74) *Attorney, Agent, or Firm*—Laurence A. Greenberg; Werner H. Stemer; Ralph E. Locher

(57) ABSTRACT

For controlling an internal combustion engine, the activation of an accelerator pedal is sensed and a setpoint value for the angle setting of the throttle valve is determined in dependence on the measured variable of an accelerator pedal value signal transmitter and on further influencing variables from a vehicle movement dynamics control device, a cruise controller device and/or a gearbox control device. The setpoint value is restricted to an unthrottled throttle valve angle of an unthrottled state of the engine. An over travel of the throttle valve, which corresponds to an adjustment range of the throttle valve between the unthrottled throttle valve angle and a fully open setting of the throttle valve is used, in dependence on the measured variable and at least one of the influencing variables, to open the throttle valve beyond the unthrottled throttle valve angle.

7 Claims, 1 Drawing Sheet

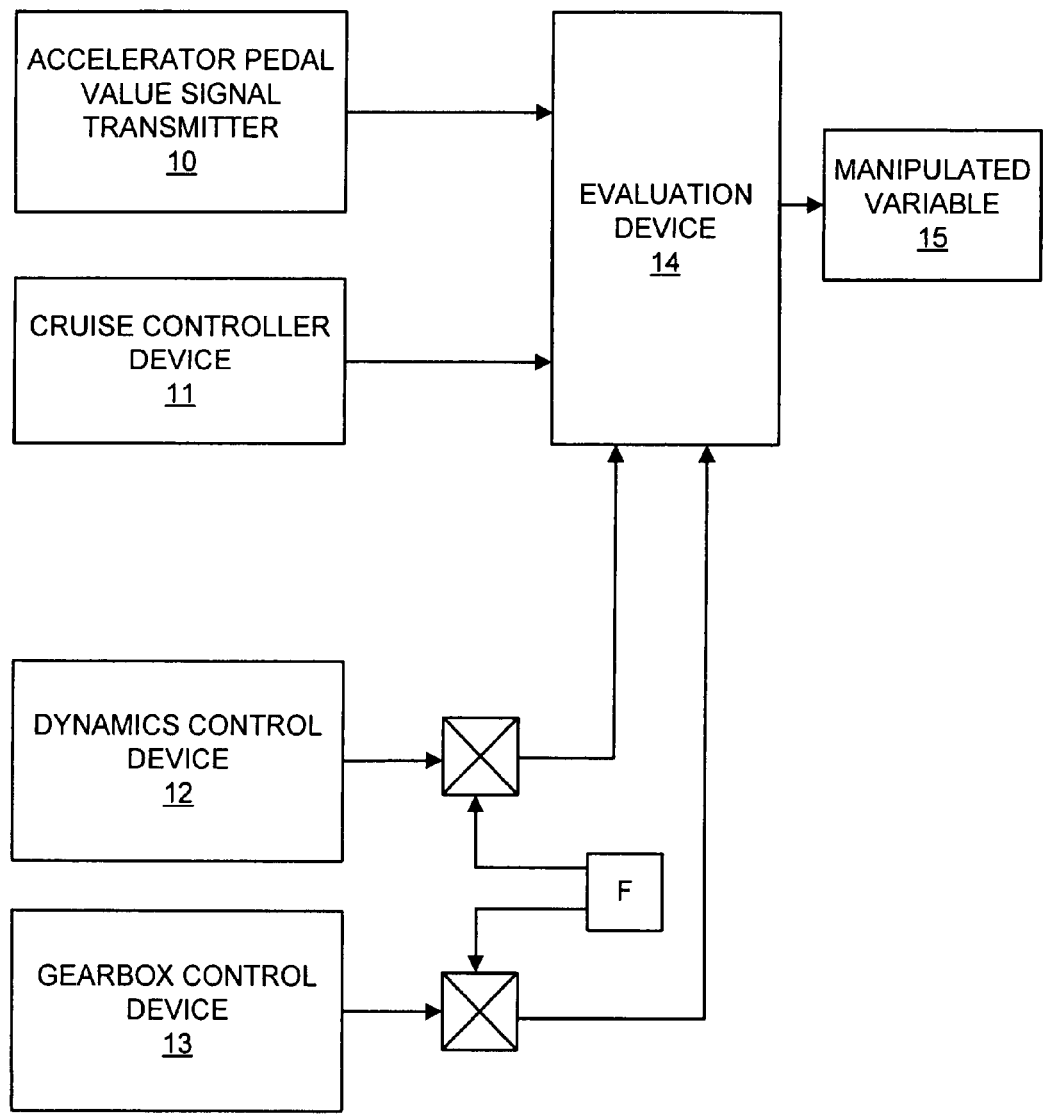

METHOD FOR CONTROLLING AN INTERNAL COMBUSTION ENGINE

CROSS-REFERENCE TO RELATED APPLICATION

This application claims the priority, under 35 U.S.C. § 119, of German application DE 10 2006 020 062.4-26, filed Apr. 29, 2006; the prior application is herewith incorporated by reference in its entirety.

BACKGROUND OF THE INVENTION

Field of the Invention

The invention relates to a method for controlling an internal combustion engine, specifically for controlling an opening setting or angle setting of a throttle valve which determines a supply of combustion air to the internal combustion engine. The activation of an accelerator pedal is sensed electrically or electronically and a setpoint value for the angle setting of the throttle valve is determined in dependence on the corresponding measured variable of an accelerator pedal value signal transmitter and in dependence on a electrical or electronic influencing variable of a cruise controller device. The setpoint value is restricted to an unthrottled throttle valve angle in which an unthrottled state of the internal combustion engine is present. Over travel of the throttle valve, which corresponds to the adjustment range of the throttle valve between the unthrottled throttle valve angle and the fully open setting of the throttle valve is used in dependence on the measured variable of the accelerator pedal value signal transmitter and/or in dependence on the influencing variable of the cruise controller device in order to open the throttle valve beyond the unthrottled throttle valve angle.

In conventional internal combustion engines, the quantity of combustion air which is fed to the internal combustion engine is set by virtue of the fact that the opening setting or angle setting of a throttle valve is set in dependence on the activation of an accelerator pedal performed by a driver by a mechanical Bowden cable, wherein the opening setting or angle setting of the throttle valve determines the supply of combustion air to the internal combustion engine. Depending on the opening setting or angle setting of the throttle valve, and thus in dependence on the supply of combustion air to the internal combustion engine, the quantity of fuel which is fed to the internal combustion engine is determined in order ultimately to set the composition of the ignitable combustion air/fuel mixture.

In modern internal combustion engines, the mechanical adjustment of the throttle valve is increasingly being replaced by electric or electronic adjustment, this electric or electronic adjustment of the throttle valve also being referred to by the term electronic accelerator pedal (EGAS). In this context, the activation of the accelerator pedal which is performed by a driver is sensed electrically or electronically using an accelerator pedal value signal transmitter, a corresponding measured variable of the accelerator pedal value signal transmitter being used to determine a setpoint value for the angle setting of the throttle valve. An internal combustion engine with EGAS is known from published, non-prosecuted German patent application DE 197 42 083 A1, corresponding to U.S. Pat. No. 6,302,644.

In internal combustion engines with EGAS, both the electrical and electronic measured variable of the pedal value signal transmitter and at least one further electrical or electronic influencing variable, for example an influencing variable of a cruise controller device, a vehicle movement dynamics control device and/or a gearbox control device, are used to determine the setpoint value for the throttle valve. In this context, the setpoint value for the angle setting of the throttle valve is determined in such a way that the setpoint value is restricted to an unthrottled throttle valve angle at which an unthrottled state of the internal combustion engine is present.

The unthrottled throttle valve angle does not correspond here to the fully open setting of the throttle valve but rather instead to an angle setting in which the pressure downstream of the throttle valve corresponds approximately to the pressure upstream of the throttle valve, therefore the setting in which the throttle valve hardly restricts the combustion air stream to the internal combustion engine at all. The unthrottled throttle valve angle is, in particular, dependent on the rotation speed of the internal combustion engine, in which case, at low rotational speeds of the internal combustion engine, an unthrottled throttle valve angle can be produced which is less than half the fully open setting of the throttle valve.

At steady-state operating points of the internal combustion engine it is appropriate to limit the setpoint value for the angle setting of the throttle valve to the unthrottled throttle valve angle, but at dynamic operating points, in particular when there are brief intermediate gas surges, it prevents sufficiently rapid filling of the internal combustion engine with combustion air and thus with the combustion air/fuel mixture. This is perceived as non-sporty behavior.

In order to improve the dynamic or sporty behavior it is possible, in internal combustion engines which are known from practice, to use over travel of the throttle valve which corresponds to the adjustment range of the throttle valve between the unthrottled throttle valve angle and the fully open setting of the throttle valve, in dependence on the measured variable of the accelerator pedal value signal transmitter and/or in dependence on the influencing variable of the cruise controller process, to open the throttle valve beyond the unthrottled throttle valve angle.

SUMMARY OF THE INVENTION

It is accordingly an object of the invention to provide a method for controlling an internal combustion engine which overcomes the above-mentioned disadvantages of the prior art methods of this general type, which permits an even more sporty driving behavior.

With the foregoing and other objects in view there is provided, in accordance with the invention, a method for controlling an internal combustion engine by controlling an opening setting or an angle setting of a throttle valve for determining a supply of combustion air to the internal combustion engine. The method includes sensing an activation of an accelerator pedal electrically or electronically with an accelerator pedal value signal transmitter resulting in a measured variable. A setpoint value for the angle setting of the throttle valve is determined in dependence on the measured variable and further electrical or electronic influencing variables provided from a vehicle movement dynamics control device, a cruise controller device, and/or a gearbox control device. The setpoint value is restricted to an unthrottled throttle valve angle for an unthrottled state of the internal combustion engine. An over travel of the throttle valve, corresponding to an adjustment range of the throttle valve between the unthrottled throttle valve angle and a fully open setting of the throttle valve, in dependence on the measured variable of the accelerator pedal value signal transmitter and the influencing variables from at least two of the cruise controller device, the vehicle movement dynamics control device and the gearbox control, is used to open the throttle valve beyond the unthrottled throttle valve angle.

According to the invention, the over travel of the throttle valve is also used, in dependence on the influencing variable of the vehicle movement dynamics control device and/or in dependence on the influencing variable of the gearbox control device, in order to open the throttle valve beyond the unthrottled throttle valve angle.

Within the sense of the present invention here it is proposed first to use the over travel of the throttle valve, in dependence on the influencing variable of the vehicle movement dynamics control device and/or in dependence on the influencing variable of the gearbox control device, in order to open the throttle valve beyond the unthrottled throttle valve angle. As a result, the dynamic behavior of internal combustion engines can be improved.

Other features which are considered as characteristic for the invention are set forth in the appended claims.

Although the invention is illustrated and described herein as embodied in a method for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block circuit diagram clarifying a method according to the invention for controlling an internal combustion engine.

DETAILED DESCRIPTION OF THE INVENTION

The present invention relates to a method for controlling an internal combustion engine, specifically for controlling an opening setting or angle setting of a throttle valve which determines a supply of combustion air to the internal combustion engine.

A setpoint value for the angle setting of the throttle valve is determined in order to control the opening setting or angle setting of the throttle valve. The setpoint value for the angle setting of the throttle valve is determined on the basis of a plurality of electrical or electronic variables. The setpoint value for the angle setting of the throttle valve is thus dependent on the activation of an accelerator pedal which is performed by a driver, an accelerator pedal value signal transmitter sensing the activation of the accelerator pedal electrically or electronically and outputting a corresponding electrical or electronic measured variable. Furthermore, the setpoint value for the angle setting of the throttle valve is dependent on electrical or electronic influencing variables of a cruise controller device, a vehicle movement dynamics control device and a gearbox control device. In this context, the setpoint value for the angle setting of the throttle valve is determined in such a way that the setpoint value is restricted to an unthrottled throttle valve angle in which an unthrottled state of the internal combustion engine is present. The adjustment range of the throttle valve between the unthrottled throttle valve angle and the fully open setting of the throttle valve is referred to as the over travel of the throttle valve.

The present invention relates to controlling the opening setting or angle setting of the throttle valve, by which the valve can be opened beyond the unthrottled throttle valve angle by utilizing the over travel of the throttle valve. This is described below in greater detail with reference to the FIGURE of the drawing.

For example, the FIGURE shows in a highly schematic form in a block circuit diagram an accelerator pedal value signal transmitter 10, a cruise controller device 11, a vehicle movement dynamics control device 12 and a gearbox control device 13. The accelerator pedal value signal transmitter 10, the cruise controller device 11, the vehicle movement dynamics control device 12 and the gearbox control device 13 each output an electrical, electronic or torque-based variable.

For example, the accelerator pedal value signal transmitter 10 outputs an electrical or electronic measured variable which is dependent on an activation of the accelerator pedal which is performed by a driver, and corresponds to a driver request setpoint torque of the internal combustion engine. The cruise controller device 11, the vehicle movement dynamics control device 12 and the gearbox control device 13 likewise output electrical, electronic or torque-based variables, these influencing variables being setpoint torques of the internal combustion engine which are predefined as intervention torques by the cruise controller device 11, the vehicle movement dynamics control device 12 or the gearbox control device 13.

The electrical or electronic variables which are output by the accelerator pedal value signal transmitter 10, the cruise controller device 11, the vehicle movement dynamics control device 12 and the gearbox control device 13 are accordingly setpoint torques of the internal combustion engine, these electrical or electronic variables being fed to an evaluation device 14 in which the maximum setpoint torque of the internal combustion engine is selected from the setpoint torques which are made available. On the basis of the maximum setpoint torque of the internal combustion engine which is selected in the evaluation device 14, a manipulated variable 15 is then generated for the throttle valve, and on the basis of the manipulated variable 15 the throttle valve can be opened beyond the unthrottled throttle valve angle in the region of the over travel of the throttle valve.

Utilizing the over travel of the throttle valve to open the throttle valve beyond the unthrottled throttle valve angle on the basis of the setpoint torque which is output by the accelerator pedal value signal transmitter 10 and on the basis of the setpoint torque which is output by the cruise controller device 11 is already customary in methods for controlling an internal combustion engine which are known from practice. According to the invention, the over travel of the throttle valve is then also utilized in dependence on the setpoint torque which is output by the vehicle movement dynamics control device 12 and/or in dependence on the setpoint torque which is output by the gearbox control device 13, in order to open the throttle valve beyond the unthrottled throttle valve angle. For this purpose, as can be inferred by the FIGURE, the setpoint torque which is output by the vehicle movement dynamics control device 12 and the setpoint torque which is output by the gearbox control device 13 are increased by a multiplication factor F. The setpoint torques which are respectively increased by the multiplication factor F are fed to the evaluation device 14 in order to determine the maximum setpoint torque. What is significant here is that the multiplication factor F makes it possible to influence the external requirements in such a way that internal limitations can be bypassed.

The multiplication factor F is a rotational-speed-dependent and/or torque-dependent multiplication factor, that is to say a multiplication factor which is dependent on the operating point of the internal combustion engine. In the exemplary embodiment shown, the same multiplication factor F is used to increase the setpoint torque which is output by the vehicle movement dynamics control device 12 and to increase the setpoint torque which is output by the gearbox control device 13. It is also possible to provide for different multiplication factors to be used in this regard.

Within the sense of the present invention it is also possible to provide for the over travel of the throttle valve to be used in dependence on the setpoint torque which is output by the vehicle movement dynamics control device 12 and the setpoint torque which is output by the gearbox control device 13 only when the corresponding setpoint torques are plausible in terms of safety technology. It is thus possible, for example, using algorithms, to check whether the setpoint torques which are output by the vehicle movement dynamics control device 12 and the gearbox control device 13 are plausible. The corresponding setpoint torques are used in the evaluation device 14 after being appropriately increased by the multiplication factor in order to form maximum values only if the safety check has a positive result.

The invention claimed is:

1. A method for controlling an internal combustion engine by controlling one of an opening setting and an angle setting of a throttle valve for determining a supply of combustion air to the internal combustion engine, which comprises the steps of:

sensing an activation of an accelerator pedal one of electrically and electronically with an accelerator pedal value signal transmitter resulting in a measured variable;

determining a setpoint value for the angle setting of the throttle valve in dependence on the measured variable and further electrical or electronic influencing variables provided from at least one of a vehicle movement dynamics control device, a cruise controller device, and a gearbox control device, the setpoint value being restricted to an unthrottled throttle valve angle for an unthrottled state of the internal combustion engine; and using an over travel of the throttle valve, corresponding to an adjustment range of the throttle valve between the unthrottled throttle valve angle and a fully open setting of the throttle valve, in dependence on the measured variable of the accelerator pedal value signal transmitter and the influencing variables from at least two of the cruise controller device, the vehicle movement dynamics control device and the gearbox control, to open the throttle valve beyond the unthrottled throttle valve angle.

2. The method according to claim 1, which further comprises:

outputting from each of the accelerator pedal value signal transmitter, the cruise controller device, the vehicle movement dynamics control device and the gearbox control device a setpoint torque as the measured variable or one of the influencing variables resulting in a plurality of setpoint torques; and selecting a maximum setpoint torque on a basis of which the throttle valve is adjusted in a region of the over travel of the throttle valve from the plurality of setpoint torques.

3. The method according to claim 2, which further comprises:

increasing the influencing variable made available by the vehicle movement dynamics control device by a multiplication factor resulting in a multiplied influencing variable; and using the multiplied influencing variable to determine the maximum setpoint torque.

4. The method according to claim 2, which further comprises:

increasing the influencing variable made available by the gearbox control device by a multiplication factor resulting in a multiplied influencing variable; and using the multiplied influencing variable to determine the maximum setpoint torque.

5. The method according to claim 3, which further comprises increasing the influencing variable of at least one of the vehicle movement dynamics control device and the gear box control device by a rotational-speed-dependent and/or a torque-dependent multiplication factor.

6. The method according to claim 4, which further comprises increasing the influencing variable of at least one of the vehicle movement dynamics control device and the gear box control device by a rotational-speed-dependent and/or a torque-dependent multiplication factor.

7. The method according to claim 1, which further comprises using the over travel of the throttle valve, in dependence on at least one of the influencing variable of the vehicle movement dynamics control device and the influencing variable of the gearbox control device only if the influencing variables which are made available by the vehicle movement dynamics control device and the gearbox control device are plausible in terms of safety technology.

* * * * *